United States Patent [19]
Eicher et al.

[11] Patent Number: 4,474,105
[45] Date of Patent: Oct. 2, 1984

[54] OSCILLATORY FLUID POWERED MOTOR

[76] Inventors: Fred C. Eicher, 5405 Lois Ave., Louisville, Ky. 40219; Charles F. Evans, 3706 Alpine Cir., LaGrange, Ky. 40021

[21] Appl. No.: 235,533

[22] Filed: Feb. 18, 1981

[51] Int. Cl.³ .............................................. F01C 9/00
[52] U.S. Cl. ........................................ 92/122; 92/125
[58] Field of Search ................................. 92/125, 122

[56] References Cited

U.S. PATENT DOCUMENTS

| | | | |
|---|---|---|---|
| 2,556,648 | 6/1951 | Gorsuch | 92/125 |
| 2,902,009 | 9/1959 | Ludwig et al. | 92/125 |
| 3,131,610 | 5/1964 | Paulus | 92/125 |
| 3,215,046 | 11/1965 | Drake | 92/125 |
| 3,444,790 | 5/1969 | Rumsey | 92/125 |
| 3,890,885 | 6/1975 | Nash | 92/125 |

*Primary Examiner*—Paul E. Maslousky

[57] ABSTRACT

An oscillatory fluid powered motor includes a cylindrical body closed at its opposite ends by head members to define a chamber. Each head member has a central opening in aligned relationship with the longitudinal axis of the cylindrical body for receiving the opposite ends of a shaft. At least one vane is structurally associated with the shaft for rotation therewith, and extends radially of the cylindrical housing from the shaft. At least one stationary stator is attached to the interior wall of the cylindrical housing and extends radially of the housing. The cylinder heads include a bearing surface surrounding the central openings, and a ring seal concentrically disposed with and radially spaced from the central openings. The vane has a peripheral seal which sealingly contacts the bearing surface of each cylinder head, the interior wall surface of the cylindrical body and a portion of each ring seal. Similarly, the stator has a peripheral seal which sealingly contacts the bearing surface of each cylinder head, the peripheral surface of the shaft, and a portion of each ring seal.

17 Claims, 12 Drawing Figures

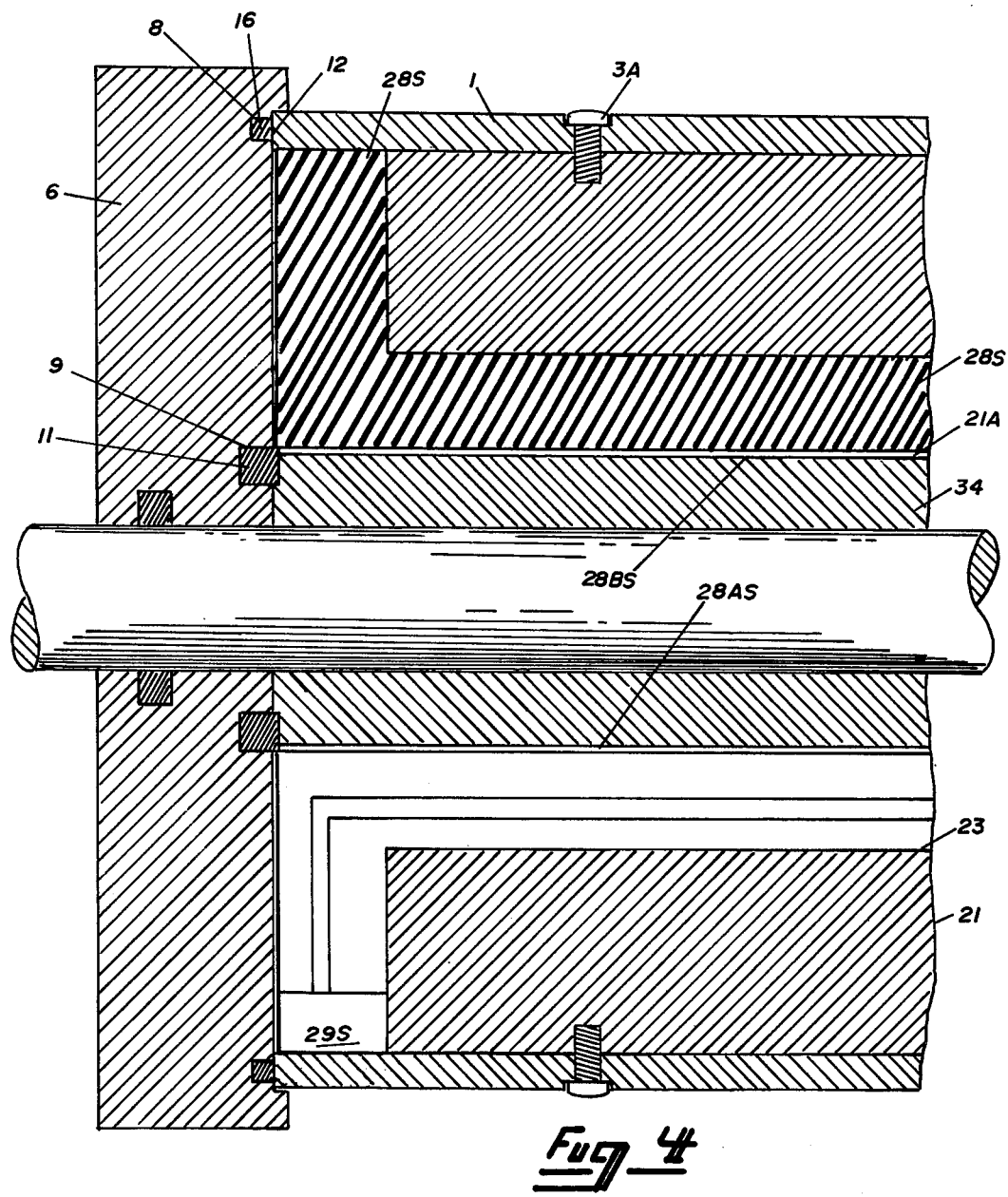

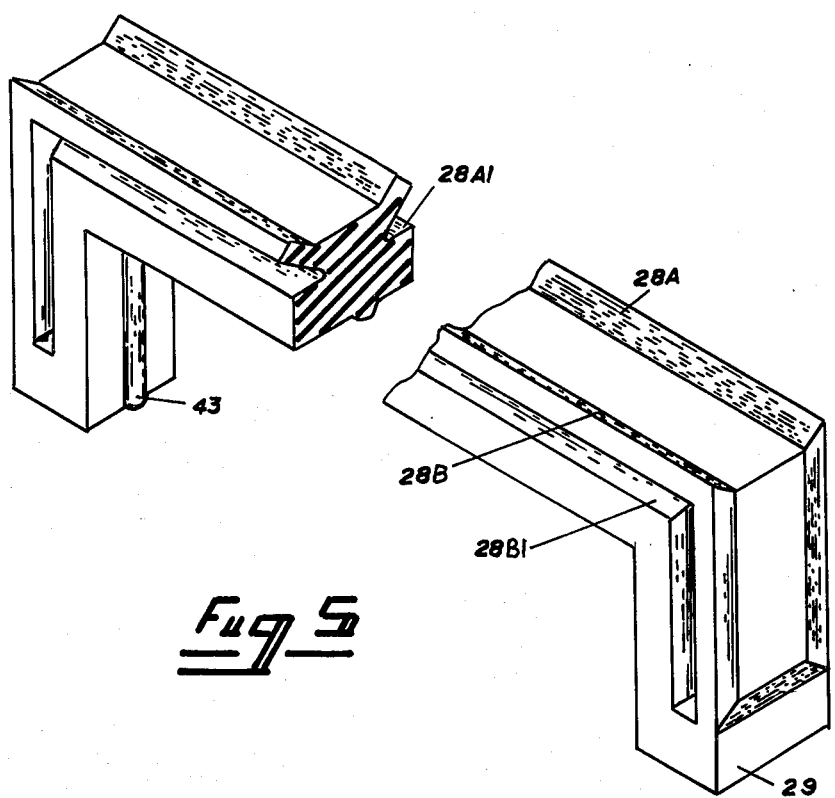

4,474,105

OSCILLATORY FLUID POWERED MOTOR

BACKGROUND OF THE INVENTION

This invention relates generally to fluid motors, more particularly to a fluid actuated, oscillating reversing motor adapted to provide reciprocatory rotary motion through a portion of a revolution.

Devices of the type are capable of many uses such as closing or opening valves, toggling, camming, clamping, positioning, etc. and the like or performing other services, particularly where "push-pull" or reciprocatory movements are involved. Such actuators usually embody a housing head, a chamber in which a vane is moved first in one direction and then the other to provide a rotary action on a cooperative shaft throughout a portion of a revolution. In such arrangements the vane is impelled to and fro by the pressure of the fluid admitted to one side or the other of the piston or vane within the chamber and with the concurrent exhaust of fluid at the opposite side.

Previous arrangements in such rotary type actuators have required frequent servicing and replacement due to wear, particularly under heavy duty service. More particularly replacement of the sealing means to assure satisfactory operation of the device with a minimum amount of fluid leakage. Prior art arrangements provide a pneumatic system for a leakage rate of 0.1 cubic feet per minute and in some instances the leakage rate is considerably higher.

Various prior art arrangements are available, but in arrangements in pneumatic systems, the pressure required for movement of the shaft is excessive due to friction caused by the sealing arrangement.

One prior art arrangement is shown in U.S. Pat. No. 3,128,679,-Trendle wherein a rotary device is shown having a chamber with a vane and a seal arrangement including an internal seal formed around the inner end of a shaft bore where the shaft passes through the head of the device.

A similar device is shown in U.S. Pat. No. 2,735,406 -Britton. In both arrangements, the shaft seal is located in the bore provided for passage of the power shaft and it has been found that such an arrangment provides a leakage path for the actuating fluid and further increases the moving resistance of the shaft.

Other arrangements for vane type actuators are shown in U.S. Pat. No. 3,131,610-Paulus, wherein a sealarrangement is provided around the entire periphery of the vane and in U.S. Pat. No. 3,179,020 where a split vane is provided with a seal captured between the sections of the vane.

No prior art arrangement is known which provides an actuator having a cylindrical body with head means at each end, where the head means includes openings to rotatably receive the shaft of the actuator where an annular seal is provided on the inner surface of each head to abut an enlarged portion of the shaft and the end of a seal provided around the edge of the vane.

Furthermore, no prior seal is known for use in an actuator device which does not require stiffening or backup support when applied to a vane or stator member in a rotary actuator device to prevent rolling or twisting of the seal under dynamic conditions.

SUMMARY OF THE INVENTION

The present invention provides a novel sealing arrangment for a fluid powered actuator which includes a shaft movable between first and second positions less than one full revolution and where the force required to move the shaft is minimized while the rate of leakage from the device is minimized.

More particularly, the present invention provides a fluid powered actuator having a cylindrical body member with head means at each end.

Moreover, the present invention provide a fluid powered actuator with a leak rate substantially less than 0.1 cubic feet per minute while providing an arrangment which require less force for operation, particularly break away torque. More particularly, the present invention provides an oscillatory fluid powered motor including a cylindrical body defining a chamber, first and second head members disposed one on each end of the body member in sealing relation therewith, and each having a central opening in aligned relation with the longitudinal axis of the cylinder, and each having a first annular groove surrounding the opening in spaced relation therefrom, and each having an inner bearing surface on the side thereof exposed to the chamber, ring means disposed in the first annular groove, at least one elongate stator located on the inner surface of the body and extending into the chamber and including first and second ends in spaced relation from the bearing surface of the first and second heads and an outer edge extending parallel with the longitudinal axis of the body member and having a stator groove around the first and second edges and the outer edge, a rotor including shaft means having a first end received in the opening of the first head and a second end rotably received in the opening of the second head and including an enlarged section of circular cross section and diameter greater than the diameter of the shaft providing a peripheral bearing surface extending generally between the first and second head members where the bearing surface is in selectively spaced parallel relation with the outer edge of the stator and where each end of the enlarged section respectively contacts a portion of one of the ring seal means of the first and second heads, and further including at least one vane member extending radially from the enlarged section having a vanegroove around the periphery thereof, vane seal means to be received in the vane groove to contact the bearing surface of the first and second heads, the inner surface of the body and a portion of the ring seal of each head to provide fluid seal, stator seal means to be received in the stator groove to contact the first and second heads and the enlarged section to provide fluid seal between the stator and enlarged portion of the shaft and the head members, fluid inlet and fluid outlet means to the chamber to selectively vary fluid pressure on opposite sides of the vane to move the vane and rotate the shaft. Examples within the scope of the present invention are illustrated and described in the accompanying drawings and it will be understood that various other arrangements also within the scope of the present invention will occur to those skilled in the art upon reading the disclosure set forth hereinafter.

BRIEF DESCRIPTION OF THE DRAWINGS

Examples in accordance with the present invention are shown in the accompanying drawings wherein:

FIG. 4 is a view taken along a plane passing through line 4—4 of FIG. 2;

FIG. 5 is a perspective view partially in section of a vane seal within the scope of the present invention;

DETAILED DESCRIPTION OF THE DRAWINGS

Figure 1:
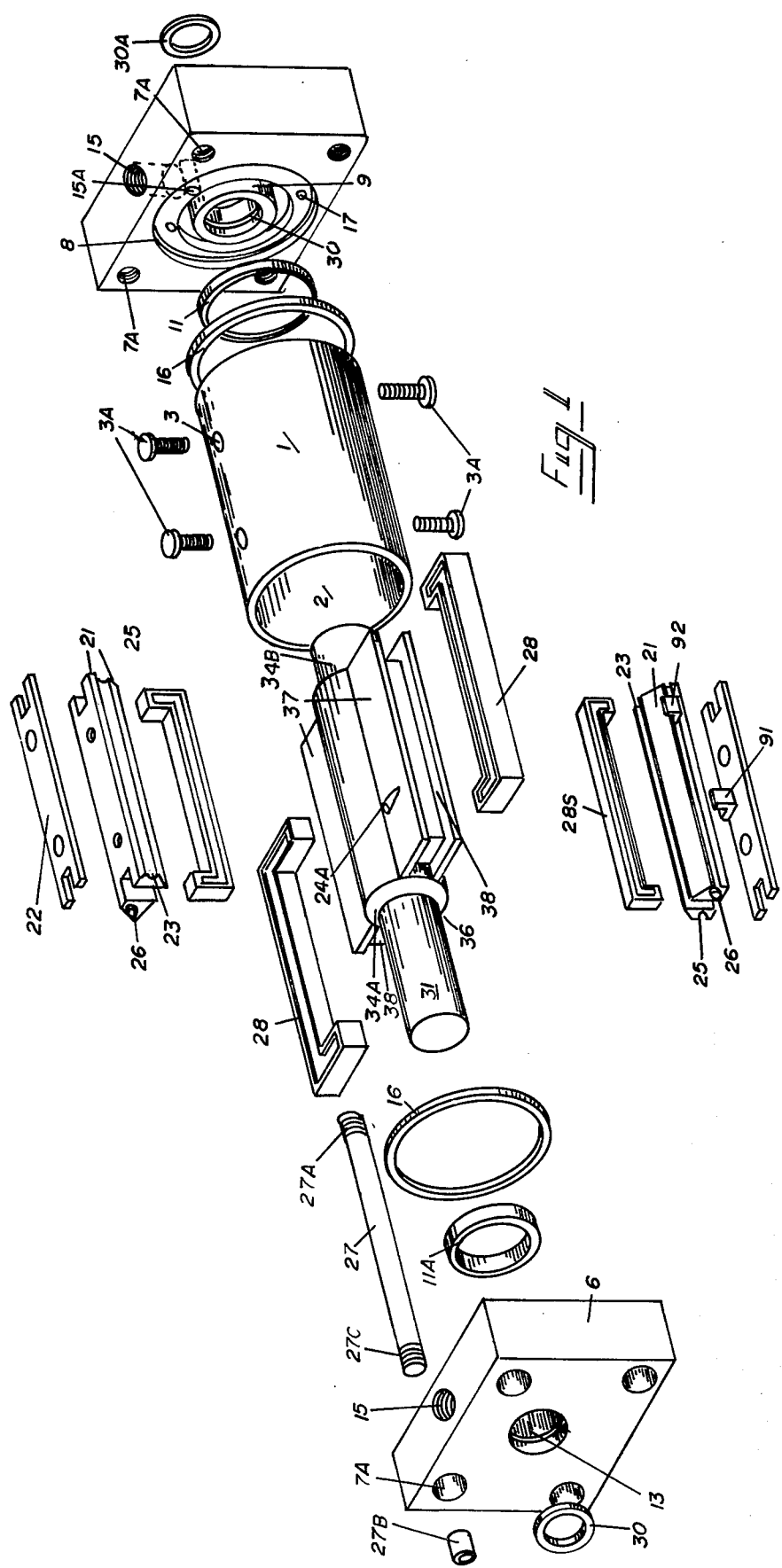
FIG. 1 is an exploded view of one arrangement within the scope of the present invention.

Referring first to FIG. 1 which is an exploded view of one arrangement within the scope of the present invention for 90° rotation, a cylindrical body 1 is shown defining an internal chamber 2 to receive the elements illustrated in exploded form.

Body 1 can be fabricated from any suitable material but it has been found that hardened, anodized aluminum provides the most satisfactory material for construction.

Furthermore it has been found that the unique seal arrangement provided by the present invention permits the use of a commerical tolerance tube which provides significant cost savings over prior art devices requring special tolerances tubes. Heads 6 and 7 are provided at opposite ends of body 1 and include an annular groove 8 (the corresponding annular groove and inner side configuration of head 6 not being shown, it being understood that heads 6 and 7 are mirror images of each other where head 6 is adapted to be received on the end of body member 1, opposite the end receiving head 7) to receive sealing ring 16. A second internal groove 9 is provided in each head 6, 7 each to receive a sealing ring 11 as described hereinafter. An inset bearing surface 10 is provided by each head inside groove 8 to receive the seals of a rotor vane and stator vane as described hereinafter.

A central aperture 13 is provided in each head 6, 7, as shown where in assembled form aperatures 13 are in longitudinally aligned relation to receive opposite ends of a shaft 31 as described hereinafter. An internal groove 30 is provided in each of the central apertures 13 of each head 6 and 7 to receive an "O" ring seal 30A to prevent inward migration of grit or other contaminates.

Annular groove 9, provided by each head 6, 7, (shown in head 7) is disposed in spaced relation from opening 13. Alignment apertures 17 are provided in each head 6, 7 to receive an alignment post described hereinafter carried by the stator assembly also described hereinafter. Also each head 6 and 7 is provided with a fluid inlet/outlet 15-15A to communicate with chamber 2 when the unit is assembled to selectivley provide admission and exhaust of operating fluid. In FIG. 1, aperture 15 is shown communicating with an aperture 15A in head 7. A similar fluid inlet/outlet is provided in head 6 but is not shown in FIG. 1 only opening 15 being shown.

A rotor assembly 36 is provided with, for example, vanes 37 extending outwardly from an enlarged portion 34 of generally circular cross section and carried by a shaft 31. While an arrangment is shown in FIG. 1 providing 2 vanes other arrangements providing a single vane are also included within the scope of the present invention and discussed hereinafter.

The surface of enlarged portion 34 provides a stator vane sealing surface and extends along a portion of the length of shaft 31 where the length of elarged portion 34 is approximately equal to the length of body 1 so ends 34A and 34B of enlarged portion 34 abut seals 11 of heads 6, 7 when the unit is assembled as described hereinafter. Each vane 37 includes grooves 38 around the free periphery thereof adapted to receive channel shaped sealing members 28 as described hereinafter. In the arrangement shown cross bores 24A-24B are provided to extend through enlarged section 34 and shaft 31 to facilitate application of fluid pressure as described hereinafter.

A pair of stators 21 are provided to be secured to opposite sides of body 1 and as indicated have free edges at opposite ends thereof (which in the assembled form are located, respectively, adjacent the inner surface of heads 6,7) and an outer edge (which in assembled form is located adjacent the surface of enlarged section 34). Each stator 21 is received inside body 1 to be positioned in parallel relation with the longitudinat axis of body 1 and secured by screws 3A. Each stator is generally the same length as body 1 and a gasket 22 is provided to be received between the inner surface of the stator and body 1 to prevent fluid leakage through aperture 3 provided in body 1 to receive screws 3A. Also each stator 21 is provided with a perpherial groove 23 in the free edges and outer edge and adapted to receive a channel shaped sealing member 28S which can be similar to sealing member 28 received in grooves 38 of vanes 37. A longitudinally extending groove 25 is provided in each side of each stator 21 where one of the grooves 25 is adapted to be positioned in aligned relation with an aperture 15A of one head 6,7 as described hereinafter to facilitate selective admission/emission of fluid to and from chamber 2. A post 26 is provided at the end of each stator and retained in the opposite groove 25 to be received in an alignment aperture 17 of head 6, 7, (the apertures 17 of head 6 not being shown).

The unit is assembled as indicated in FIG. 1 and held by bolts 27 which have threaded ends 27A received in tapped holes 7A of head 7 and extend between heads 6 and 7 which body 1 therebetween to receive nuts 27B on threaded ends 27C.

Figure 2:
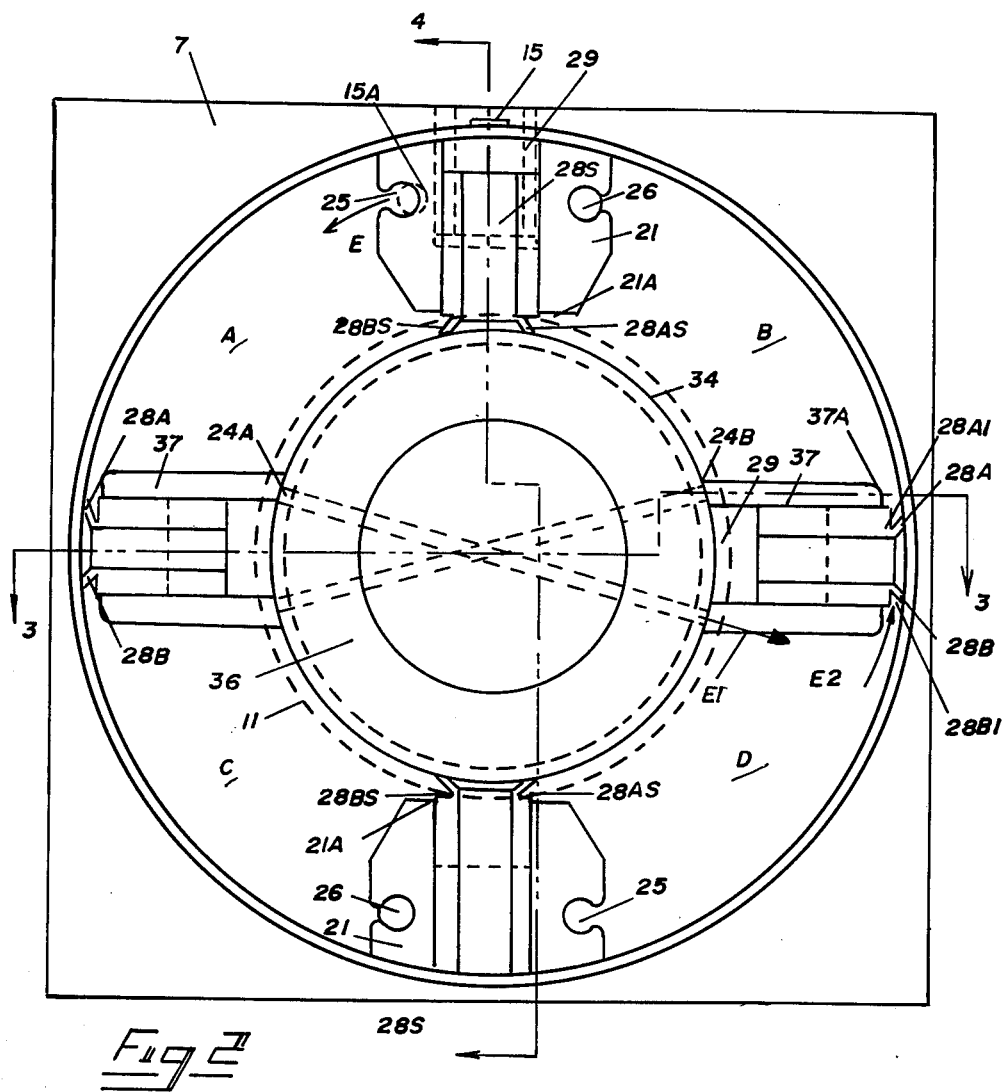
FIG. 2 is a view of the arrangement shown in FIG. 1 in assembled form with head 6 removed.

FIG. 2 is an end view illustration of the device shown in FIG. 1 in assembled form with head 6 removed so stator assemblies 21 are shown in vertical orientation and the end of assembled rotor 36 is shown with vanes 37 in a horizontal position.

FIG. 2 illustrates one feature of the seals of the present invention where fluid pressure in chamber 2 assists in sealing. In FIG. 2 chambers A,B,C, D are defined by vanes 37 and stator 21, as shown. In the arrangement shown, for purposes of discussion it can be assumed that fluid is supplied to Chamber A from an inlet 15A as indicated by arrow E and bleeds through cross bore 24A so fluid represented by arrow E1 is admitted to chamber D to rotate vanes 37 in a counterclockwise direction.

Vane seals 28 are disposed with lips 28A-28B along the outer periphery of the seals as described hereinafter bearing on the inner surface of body 1.

The operation of the seals is illustrated by reference to arrow E2. Seal 28 described hereinafter, includes grooves 28A1, 28B1 to define lips or wings 28A and 28B on the outer surface of seal 28. It will also be noted that vanes 37 have rounded edges 37A (which can have the same radius as the radius of body 1) inset from the innersurface of body 1 to provide space between body 1 and the edge 37A of the vane for flow of fluid and application of fluid pressure, for example, to groove 28B1 and underside of lip 28B to urge the lip to sealing relation to the surface of body 1. A similar relationship occurs with respect to seal lip 28AS of stator 21 in chamber D and lip 28BS of seal 28S of stator 21 in chamber A as well as lip 28A of vane 37 in chamber A. It will be understood that the opposite seals are urged to sealing relation when pressure is applied to chamber B and C and vanes 37 rotate in a clockwise direction.

Figure 3:
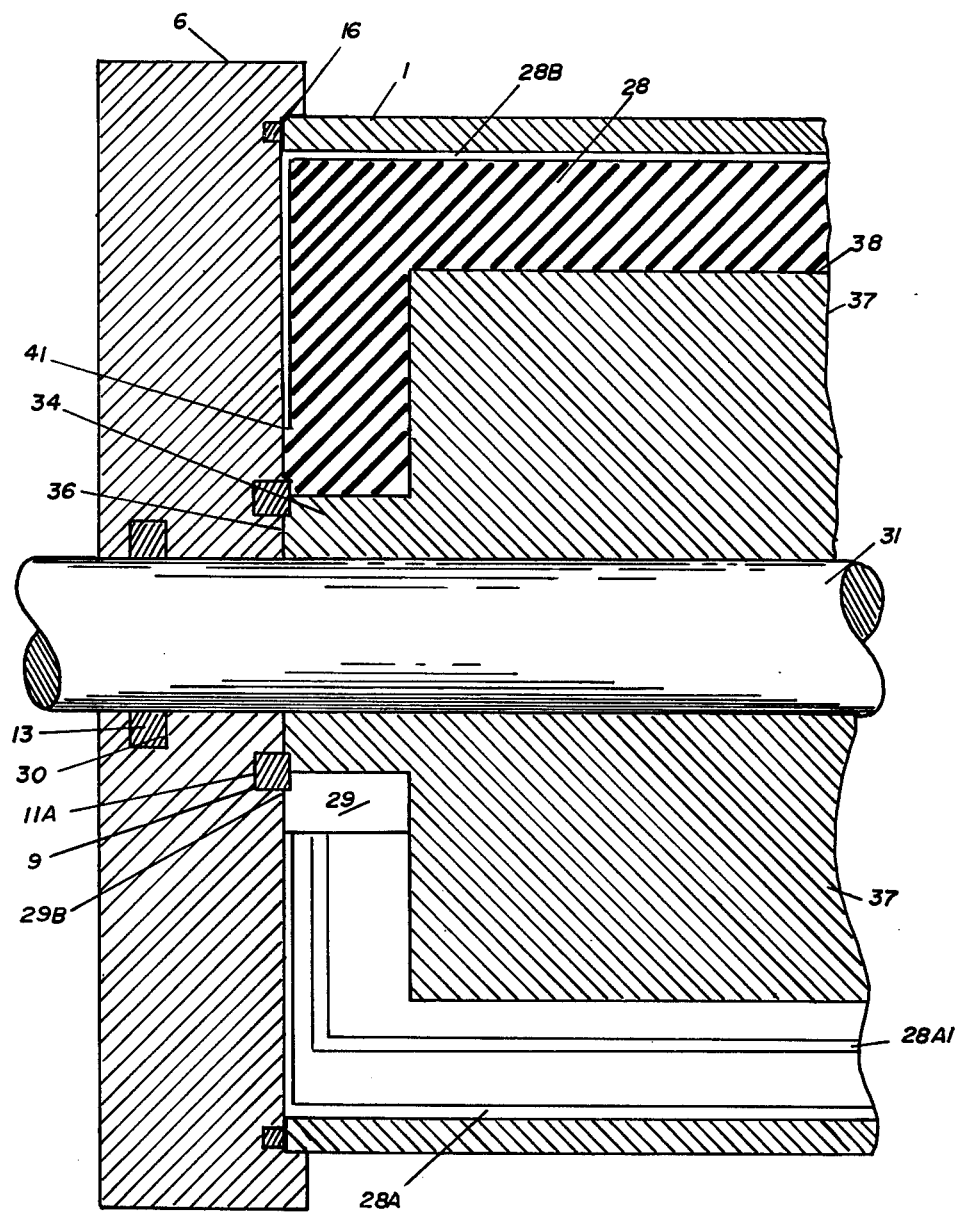
FIG. 3 is a view taken along a plane passing through line 3—3 of FIG. 2.

In accordance with another feature of the present invention a base 29 is provided for each vane seal 28 and engages a portion of ring seal 11 (the seal 11 of head 6 being shown in dotted line in FIG. 2) to provide sealing as shown in FIG. 3. FIG. 2 further illustrates that ring 11 engages both the base 29 of the seals 28 of vanes 37 and a portion of enlarged portion 34 of vane assembly 36.

FIG. 2 further illustrates the relative positions of grooves 25 provided for fluid flow to chambers A and B to move vanes 37 and rotate shaft 31.

With reference to FIG. 3 the sealing engagement between vane seals 28, head 6 and body member 1 is shown. In FIG. 3 lip 28A of a seal 28 of vanes 37 is shown in sealing relation on inset surface 10 of head 6.

FIG. 3 also illustrates the engagement between ring seal 11 which is received in groove 9 in spaced relation from apertures 13, and base 29 of each seal 28. The view further illustrates that ring seal 11 also engages a portion of the end of enlarged portion 34 of rotor assembly 36 to provide a seal so that there is no need to provide a seal directly on the periphery of shaft 31 as in the prior art. However, groove 30 may be provided in heads 6 and 7 with "O" ring seal 60 to reduce inward migration of foreign particles or substances into chamber 2.

As can be seen from FIG. 4 ends 21A of stator assemblies 21 are adjacent to the enlarged portion 34 of rotor assembly 31. Seal 11 is shown and illustrates that seal member 11 bears both on the outer periphery of enlarged portion 34 of shaft assembly 36 and the lip portions 28AS and 28BS of stator seal 28S of stator 21 as described hereinafter to provide sealing.

FIG. 4 illustrates a partial longitudinal cross section taken along a plane passing through line 4—4 of FIG. 2 with head 6 in place showing seal contact between ends of enlarged portion 34 of shaft assembly 36 and the engagement between lips 28B of seals 28 and the surface of body 1 and head 6.

Body member 1 is shown as it is located in groove 12 of head member 6 with stators 21 as shown. As also shown, ring seal 11 is shown disposed in groove 9 of head 6 and stator seal 28S is shown with lips 28AS bearing on enlarged portion 34 of the shaft assembly 36. Pad 29S of seal 28S is shown engaging the inside surface of head 6 and the inner surface of body member 1 at the joint thereof. It will further be noted that ring seal 11 engages lip 28AS of seal 28S to provide a seal.

FIG. 5 is an illustration, enlarged, of a seal 28 within the scope of the present invention as previously illustrated and discussed with reference to illustrate lips 28A and 28B previously discussed. (It is to be recognized that seals 28S are similar to seal 28 and that the difference in designation is for purposes of clarity of description). Further, base 29 is illustrated which as previously described includes a face 41 engaged by the inner surface of ring seal 11 (and heads 6 and 7 when seal 28S is used on the stator). Grooves 28A I and 28B I are formed beneath lips 28A and 28B to provide the sealing characteristics previously described. It will be recognized that similar results are achieved in sealing the lips to head 6 and 7 in both stator and vane application. It has been found that the arrangement shown provides a uniform load in three directions on the seal member to insure uniform and efficient sealing against the head members 6 and 7 and the body member 1 with respect to vanes 37 as shown in FIG. 3 and with respect to the seal between enlarged portion 34 and head members 6 and 7 with respect to stators 21 as shown in FIG. 4.

Additionally, a sealing bead 43 is provided on the underside of the seals 28 as best shown with respect to FIG. 5 where bead 43 promotes sealing in the grooves 38 of vanes 37 as shown in FIG. 3 and gooves 23 of stators 21 as shown in FIG. 4.

In operation of a device to turn 90° as illustrated in FIGS. 1 and 2, it is necessary to provide means for the actuating fluid to flow between opposite side of the chamber defined by body 1 and crossbored hole 24, is provided in some applications. Where the shaft is of the type described hereinabove with an enlarged portion and where the enlarged portion of the shaft and the shaft itself may provide a leak path for emission of the pressurizing fluid between cross bores.

Figure 6:
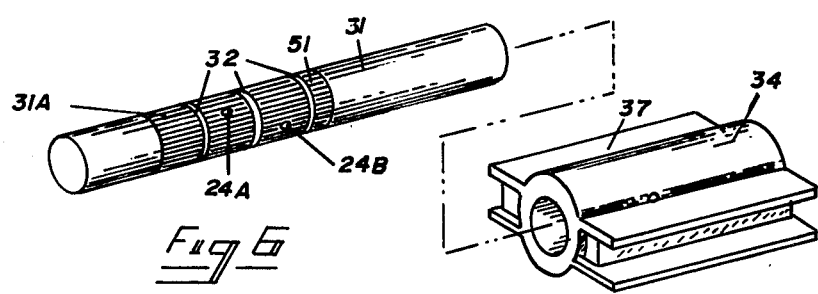
FIG. 6 is a view of an example of a rotor within the scope of the present invention.

FIG. 6 is a perspective exploded view of a shaft assembly showing shaft 31 with a knurled section 51. Vane assembly 36 is shown off shaft 31 where and the vane assembly including enlarged section 34 carrying vanes 37 is press fit onto shaft 31. Also grooves 32 can be provided in shaft 31 with "O" rings (not shown) received therein to prevent fluid cross flow between cross bores 24, (when provided) which are cross drilled through enlarged portion 34 and shaft 31 to bleed fluid from one side of the vane assembly to the other in certain applications as described hereinbefore.

Accordingly, in accordance with another feature of the present invention, it has been found that a shaft assembly of the type shown in FIG. 6 satisfactorily prevents such leakage.

Figure 7A:
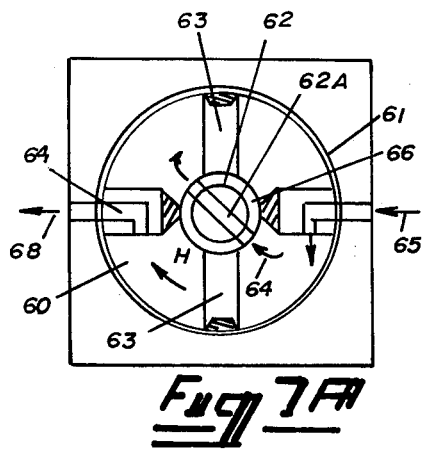
FIGS. 7a-7b illustrate operation of a 90° device within the scope of the present invention.
Figure 7B:
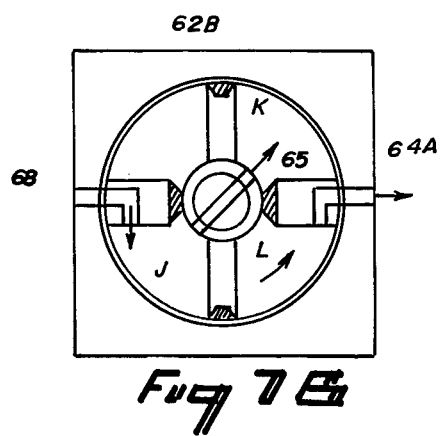

Illustration of a device of the type shown in FIG. 1 and using the shaft of the type shown in FIG. 6 is illustrated schematically in FIGS. 7A–7B. In the illustration of FIGS. 7A–7B a body member 61 is provided where a shaft assembly 62 including vanes 63 is provided shown in generally vertical orientation and stator assemblies 64, 64A as previously described are also shown. In the mode shown in FIG. 7A a pressurized fluid, for example air, is provided to a cooperative chamber G to rotate vane assembly 62 including enlarged section 66 in the direction shown by the arrow H where air flows through a cross bore 62A, of shaft 62 to chamber I to increase the surface area on which the force is applied to rotate the shaft in the direction shown. Air is exhausted from chamber 60 between vane 63 and stator 64 through conduit 68.

In the arrangement shown in FIG. 7B pressurized air is supplied to a chamber J by means of conduit 68 where the air flows through another bleed 62B as shown to chamber K to rotate the assembly in the direction shown by arrow L.

It will be understood that in previous examples and in remaining examples that where air is supplied to a chamber to move a vane in one direction, means (not shown) are provided to exhaust air from the chamber on the low pressure side of the moving vane.

Figure 8A:
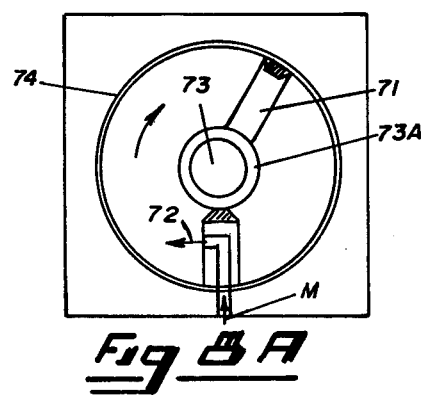
FIGS. 8a-8b are sequential schematic views of operation of a device within the scope of the present invention to rotate a shaft 270°.
Figure 8B:
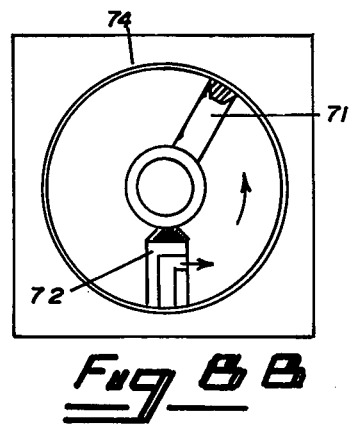

FIG. 8A is an illustration of an arrangement within the scope of the present invention for rotation through a selected arc, less than 360° namely 270° where only one vane 71 is provided along with one stator member 72 with a shaft 73 having an enlarged section 73A disposed in body 74. Fluid is applied as shown by arrow M to rotate vane 71 in the direction shown by the arrow and then is applied to the opposite side of stator 72 as shown in FIG. 8B (where it will be recognized that fluid is applied at opposite heads of stator 72 for rotation in opposite directions).

Figure 9A:
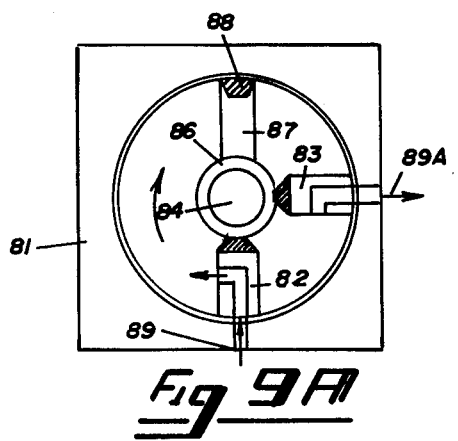
FIGS. 9a-9b are sequential schematic views of the operation of a device within the scope of the present invention to rotate a shaft 180° or less.
Figure 9B:
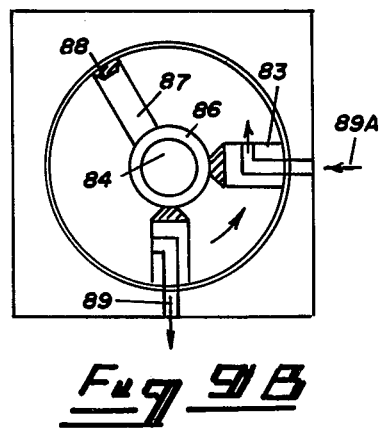

FIGS. 9A–9B illustrate an arrangement for 180° rotation where a body 81 is provided with stators 82 and 83. Shaft 84 is provided having an enlarged portion 86 as previously described which carries a vane 87 with seal 88. Inlet 89 is provided in stator 82 and fluid inlet 89 A is provided in stator 83 so that vane 87 rotates in a direction determined by the inlet receiving pressurized fluid.

It has been found that the sealing arrangement hereinbefore described in accordance with the present invention provides efficient movement of the vane in a rotary action with minimum break away torque so that substantially reduced fluid pressure is required but where the leakage is less than in prior art devices.

FIG. 1 in accordance with another feature of the present invention shows "L" shaped bumpers 91,92 where bumper 92 is in place in groove 25. Second bumper 91 is shown separated from groove 25A to illustrate the configuration of the bumpers. Bumpers 91, 92 can be of a resilient elastomeric material and can be placed, for example, in the open end of groove 25A and slightly compressed to be retained therein and then moved longitudinally through groove 25A to the described location. Bumpers 91, 92 are placed in the stators as shown to slow vanes 37 at the end of travel, absorb the energy of motion of the vanes and prevent damage to the vanes and/or the stators. Additionally, it has been found that use of bumpers as illustrated provides noise free operation of the device.

It will be recognized that the foregoing are but examples of arrangements within the scope of the present invention and it will be understood that other arrangements within the scope of the present invention will occur to those skilled in the art upon reading of the disclosure set forth hereinbefore.

The invention claimed is:

1. An oscillatory fluid powered motor including a cylindrical body defining a chamber, first and second head members disposed one on each end of the body member in sealing relationship therewith, and each having a central aperture in aligned relationship with the longitudinal axis of the cylindrical body, and each having an annular groove surrounding said aperture in spaced relation therefrom, and each having an inset bearing surface on the side thereof exposed to said chamber, ring seal means disposed in said annular groove, at least one elongate stator located on the inner surface of said cylindrical body and extending into said chamber and including first and second ends in spaced relation from the bearing surface of the first and second heads and an outer edge extending parallel with the longitudinal axis of the cylindrical body and having a stator groove around the first and second ends and the outer edge, a rotor assembly including shaft means having a first end received in the aperture of the first head and a second end rotatably received in the aperture of the second head and including an enlarged section of circular cross section and diameter greater than the diameter of the shaft providing a peripheral bearing surface extending generally between the first and second head members where the peripheral bearing surface is in selectively spaced parallel relation with the outer edge of the stator and where each end of the enlarged section respectively contacts a portion of the ring seal means of the first and second heads, and further including at least one vane member extending radially from the enlarged section having a vane groove around the periphery thereof, vane seal means received in the vane groove to contact the inset bearing surface of the first and second heads, the inner surface of the cylindrical body and a portion of the ring seal means of each head adjacent the enlarged section of the rotor assembly to provide fluid seals, stator seal means received in the stator groove to contact the inset bearing surface of the first and second heads, the peripheral bearing surface of the enlarged section of the shaft and a portion of the ring seal means to provide fluid seals between the stator and enlarged portion of the shaft and the first and second heads, and fluid inlet and fluid outlet means to the chamber to selectively vary fluid pressure on opposite sides of the vane member to move the vane member and rotate the shaft.

2. The invention of claim 1 wherein said bearing surface of said head members is flat, said vane member is rectangular and said vane seal means is one piece of molded elastomeric material of channel shape having a web section and first and second leg sections at opposite ends of the web section extending outwardly therefrom in parallel relationship to be received in the vane groove with the outer surface of the first and second leg sections contacting the bearing surface of the first and second heads, respectively, said first and second leg sections of said vane seal means include enlarged pad sections at the ends thereof to overlap a portion of the ring seal member in the heads, and with the outer surface of said web portion in contact with the inner surface of said cylindrical body.

3. The invention of claim 1 where each of the first and second head member include second groove means located in spaced annular relation from said first annular groove and adapted to receive opposite ends of said cylindrical body.

4. The invention of claim 3 wherein said bearing surface of each said first and second head members is defined between said second groove and said central aperture.

5. The invention of claim 1 wherein first and second vanes are provided to extend radially from said shaft through said chamber to said body.

6. The invention of claim 2 wherein said vane seal is of generally rectangular cross section and includes at least one outwardly extending lip means on the outer surface of said first and second leg sections, to engage said bearing surface of said first and second head means, and on said web means to to engage the inner surface of said cylindrical body.

7. The invention of claim 6 including head means on at least one surface of said vane seal received in said groove of said vane to engage a surface of said vane groove to provide a seal.

8. The invention of claim 6 including first groove means in the side of said vane seal adjacent said lip means where said first groove means is adapted to receive fluid at selected pressure to urge said lip means to sealing relation with a cooperative surface adjacent said lip means.

9. The invention of claim 1 wherein said bearing surface of said head members is flat, said stator means is of rectangular cross section and said stator seal means is one piece of molded elastomeric material of channel shape having a web section and first and second leg sections at opposite ends of the web section extending outwardly therefrom in spaced parallel relation to be received in the stator groove with the outer surface of the first and second leg members contacting the bearing surface of the first and second head members, respectively, and the outer surface of said web section contacting the peripheral bearing surface of the enlarged section of the shaft.

10. The invention of claim 9 wherein said first and second legs of said stator seal include enlarged pad sections at the ends thereof to engage the cylindrical body and the inner surface of said head members at the point of juncture.

11. The invention of claim 10 wherein said stator seal is of generally rectangular cross section and includes at least one outwardly extending lip means on the outer surface of said first and second leg sections, to respectively engage said head members, and on said web means to engage the surface of said peripheral bearing surface of said enlarged section.

12. The invention of claim 9 including head means on at least one surface of said stator seal received in said groove of said stator to engage a surface of said stator groove to provide a seal.

13. The invention of claim 1 wherein said stator includes second groove means extending longitudinally along a portion of a side of said stator having a fluid inlet adjacent one of said first and second head members, said first and second head members having fluid flow opening means communicating with said second groove inlet means.

14. The invention of claim 13 wherein said stator includes third groove means located on the side of said stator opposite said second groove means extending longitudinally along a portion of said stator, pin means received in one end of said third groove to extend longitudinally therefrom and aperture means provided in the adjacent first or second head to receive said pin means to align said stator with respect to said first or second head member.

15. The invention of claim 14 including energy absorbing bumper means carried in at least one of said second and third groove means to be engaged by said vane means as said rotor assembly rotates to one limit of travel.

16. The invention of claim 1 wherein said rotor assembly includes at least two diametral bores extending through said enlarged section of said shaft in crossed relation and in longitudinally spaced relation along said shaft, shaft groove means located on opposite sides of said bores, "O" ring seal means located in said groove means and wherein portions of said shaft carrying said bores is covered by said enlarged section.

17. The invention of claim 16 wherein the portion of said shaft covered by said enlarged section is provided with straight knurls oriented parallel to the longitudinal axis of said shaft.

* * * * *